US012202336B2

(12) United States Patent
Chang et al.

(10) Patent No.: US 12,202,336 B2
(45) Date of Patent: Jan. 21, 2025

(54) HEAD-UP DISPLAY SYSTEM HAVING A HOLOGRAPHIC PANEL COMPRISING A FIRST LAYER AND A SECOND LAYER

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 542 days.

(21) Appl. No.: 17/700,916

(22) Filed: Mar. 22, 2022

(65) Prior Publication Data

US 2023/0302899 A1 Sep. 28, 2023

(51) Int. Cl.
*B60K 35/00* (2024.01)
*B60K 35/22* (2024.01)
(Continued)

(52) U.S. Cl.
CPC .............. *B60K 35/00* (2013.01); *B60K 35/22* (2024.01); *B60K 35/23* (2024.01); *B60K 35/60* (2024.01);
(Continued)

(58) Field of Classification Search
CPC .. G02B 27/01; G02B 27/017; G02B 27/0101; G02B 27/0103; G02B 27/0172;
(Continued)

(56) References Cited

U.S. PATENT DOCUMENTS 10,379,612 B1 8/2019 Bonnier et al.
10,823,963 B2 11/2020 Banyay et al.
(Continued)

FOREIGN PATENT DOCUMENTS

CN 106004443 A 10/2016

OTHER PUBLICATIONS

F. Bruder, T. Facke, T. Rolle, The Chemistry and Physics of Bayfol HX Film Holographic Photopolymer, 2017, p. 1-36 Polymers, Leverkusen, Germany.
(Continued)

*Primary Examiner* — Sultan Chowdhury
(74) *Attorney, Agent, or Firm* — Vivacqua Crane, PLLC

(57) ABSTRACT

A head-up display system of a vehicle visually transmits information to eyes of a first occupant and eyes of a second occupant. The system includes an illumination device emitting first and second display lights having first and second polarizations, respectively. The system includes a windshield and a holographic panel including first and second layers. The display lights emit toward the holographic panel at an entrance angle relative to an axis normal to the holographic panel. The first layer diffracts the first display light having the first polarization in a first exit direction at a first exit angle relative to the axis toward the eyes of the first occupant. The second layer diffracts the second display light having the second polarization in a second exit direction at a second exit angle relative to the axis, and different than the first exit angle, toward the eyes of the second occupant.

20 Claims, 5 Drawing Sheets

(51) Int. Cl.
*B60K 35/23* (2024.01)
*B60K 35/60* (2024.01)

(52) U.S. Cl.
CPC .. *B60K 2360/1526* (2024.01); *B60K 2360/29* (2024.01); *B60K 2360/333* (2024.01); *B60K 2360/785* (2024.01); *B60Y 2200/11* (2013.01)

(58) Field of Classification Search
CPC .... G02B 27/0176; B60K 35/00; B60K 35/22; B60K 35/23; B60K 2360/23; B60K 2360/29; B60K 2360/333; B60K 2360/334; B60K 2360/785; B60K 2360/1526
See application file for complete search history.

(56) References Cited

U.S. PATENT DOCUMENTS

| | | | | |
|---|---|---|---|---|
| 2015/0236302 | A1 | 8/2015 | Gyoung et al. | |
| 2015/0268399 | A1 | 9/2015 | Futterer | |
| 2016/0209647 | A1 | 7/2016 | Fürsich | |
| 2016/0327906 | A1 | 11/2016 | Futterer | |
| 2017/0045740 | A1 | 2/2017 | Hirata et al. | |
| 2017/0184844 | A1* | 6/2017 | Matsushita | G02B 5/3083 |
| 2017/0248747 | A1 | 8/2017 | Kim et al. | |
| 2018/0181067 | A1 | 6/2018 | Hasedzic et al. | |
| 2019/0094803 | A1 | 3/2019 | Futterer | |
| 2019/0171014 | A1 | 6/2019 | Chen et al. | |
| 2019/0243140 | A1 | 8/2019 | Erler | |
| 2020/0088996 | A1 | 3/2020 | Fu et al. | |
| 2020/0159013 | A1* | 5/2020 | Hirata | B60K 35/00 |
| 2020/0192282 | A1 | 6/2020 | Kim et al. | |
| 2020/0349836 | A1 | 11/2020 | Shibata et al. | |
| 2020/0400869 | A1* | 12/2020 | Asami | G02B 5/3066 |
| 2021/0067769 | A1 | 3/2021 | Frederiksen et al. | |
| 2022/0107501 | A1 | 4/2022 | Muravev et al. | |
| 2022/0357574 | A1 | 11/2022 | Chang et al. | |

OTHER PUBLICATIONS

U.S. Appl. No. 17/481,900; Inventors: Thomas A. Seder, Kai-Han Chang, filed Sep. 22, 2021; 20 pages.

* cited by examiner

HEAD-UP DISPLAY SYSTEM HAVING A HOLOGRAPHIC PANEL COMPRISING A FIRST LAYER AND A SECOND LAYER

INTRODUCTION

The present disclosure relates to a head-up display system, and more particularly to a holographic panel for a head-up display system.

In recent years, head-up display systems have seen increased use in vehicles. These systems provide information to the driver of the vehicle in a transparent display (typically the windshield) aligned with the driver's field of vision out of the vehicle, which prevents the occupant from having to divert their attention away from the road to view the information. The use of head-up displays reduces distracted driving and improves the safety of operating the vehicle. Traditional head-up display systems are capable of transmitting information only to the driver. However, passengers within the vehicle may benefit by viewing the information provided to the driver. Furthermore, the passengers may be able to provide assistance and aide to the driver while they are operating the vehicle.

Thus, while current head-up display systems achieve their intended purpose, there is a need for a new head-up display system that addresses these issues.

SUMMARY

According to several aspects of the present disclosure, a head-up display system of a vehicle for visually transmitting information to eyes of a first occupant and eyes of a second occupant. The head-up display system comprises an illumination device configured to emit a first display light having a first polarization and a second display light having a second polarization. The head-up display system further comprises a windshield spaced from the illumination device and extending transverse to the first and second display lights and a holographic panel coupled to and extending with the windshield and comprising a first layer and a second layer. The first and second display lights emit toward the holographic panel in an entrance direction at an entrance angle relative to an axis normal to the holographic panel. The first layer is arranged to diffract the first display light having the first polarization in a first exit direction at a first exit angle relative to the axis toward the eyes of the first occupant. The second layer is arranged to diffract the second display light having the second polarization in a second exit direction at a second exit angle relative to the axis, and different than the first exit angle, toward the eyes of the second occupant.

In one aspect, the first and second exit angles are different than the entrance angle.

In another aspect, the first polarization of the first display light is orthogonal to the second polarization of the second display light.

In another aspect, the illumination device alternates emission of the first and second display lights.

In another aspect, the layers of the holographic panel are integrally formed of a unitary material.

In another aspect, the unitary material comprises a photopolymer, with each of the layers independently processed to form the holographic panel.

In another aspect, the layers are formed separately and assembled successively to form the diffractive optical element.

In another aspect, the windshield defines a surface area, with the holographic panel disposed along a portion of the windshield that is less than the surface area.

In another aspect, the windshield defines a horizontal axis bisecting the windshield and defines an upper section above the horizontal axis and a lower section below the horizontal axis, with the holographic panel disposed within the lower section of the windshield.

In another aspect, the windshield comprises an inner surface facing an interior of the vehicle and an external surface facing an exterior of the vehicle, with the holographic panel disposed along the inner surface of the windshield.

In another aspect, the windshield comprises at least two sheets stacked between the inner and outer surfaces, with each of the sheets comprising at least one internal surface facing the internal surface of another adjacent glass sheet, and with the holographic panel disposed along the internal surface of one of the sheets.

In another aspect, the at least two sheets are comprised of glass.

In another aspect, the illumination device is further defined as at least two illumination devices and the holographic panel is further defined as at least two holographic panels, each individually corresponding to the at least two illumination devices, wherein each of the illumination devices emit the respective first and second display lights toward the respective holographic panel and each of holographic panels diffract the respective first and second display lights toward the eyes of the first and second occupants.

In another aspect, the at least two holographic panels are spaced from one another horizontally along the windshield.

In another aspect, the holographic panel is a film adhered to the windshield.

In another aspect, the head-up display system further comprises at least one spatial light modulator proximate the illumination device and arranged to receive the first and second display lights emitted from the illumination device, impose a holographic image on the first and second display lights, and transmit the first and second display lights toward the holographic panel.

In another aspect, the head-up display system further comprises a pupil replicator arranged to receive the first and second display lights emitted from the illumination device, replicate the first and second display lights into a plurality of first display light and a plurality of second display light, transmit the plurality of first display light parallel to one another toward the holographic panel, and transmit the plurality of second display light parallel to one another toward the holographic panel.

In another aspect, the illumination device is further defined as a laser, with the first and second display lights emitted by the laser each being coherent.

According to several aspects of the present disclosure, a head-up display system of a vehicle for visually transmitting information to eyes of a first occupant and eyes of a second occupant. The head-up display system comprises an illumination device configured to emit a first display light having a first polarization and a second display light having a second polarization. The head-up display system further comprises a windshield spaced from the illumination device and extending transverse to the first and second display lights and a holographic panel coupled to and extending with the windshield and comprising a first layer and a second layer. The first and second display lights emit toward the holographic panel in an entrance direction at an entrance angle relative to an axis normal to the holographic panel.

The first layer is arranged to diffract the first display light having the first polarization in a first exit direction at a first exit angle relative to the axis toward the eyes of the first occupant. The second layer is arranged to diffract the second display light having the second polarization in a second exit direction at a second exit angle relative to the axis, and different than the first exit angle, toward the eyes of the second occupant. The first and second exit angles are different than the entrance angle. The first polarization of the first display light is orthogonal to the second polarization of the second display light. The illumination device alternates emission of the first and second display lights.

According to several aspects of the present disclosure, a head-up display system of a vehicle for visually transmitting information to eyes of a first occupant and eyes of a second occupant. The head-up display system comprises at least two illumination devices each configured to emit a first display light having a first polarization and a second display light having a second polarization. The head-up display system further comprises a windshield spaced from the illumination device and extending transverse to the first and second display lights, and at least two holographic panels coupled to and extending with the windshield, with each comprising a first layer and a second layer, and with each of the holographic panels individually corresponding to the at least two illumination devices. Each of the at least two illumination devices emit the respective first and second display lights emit toward the respective holographic panel in an entrance direction at an entrance angle relative to an axis normal to the holographic panel. The first layer of each of the holographic panels is arranged to diffract the respective first display light having the first polarization in a first exit direction at a first exit angle relative to the axis toward the eyes of the first occupant. The second layer of each of the holographic panels is arranged to diffract the respective second display light having the second polarization in a second exit direction at a second exit angle relative to the axis, and different than the first exit angle, toward the eyes of the second occupant. Each of the illumination devices alternates emission of the first and second display lights.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
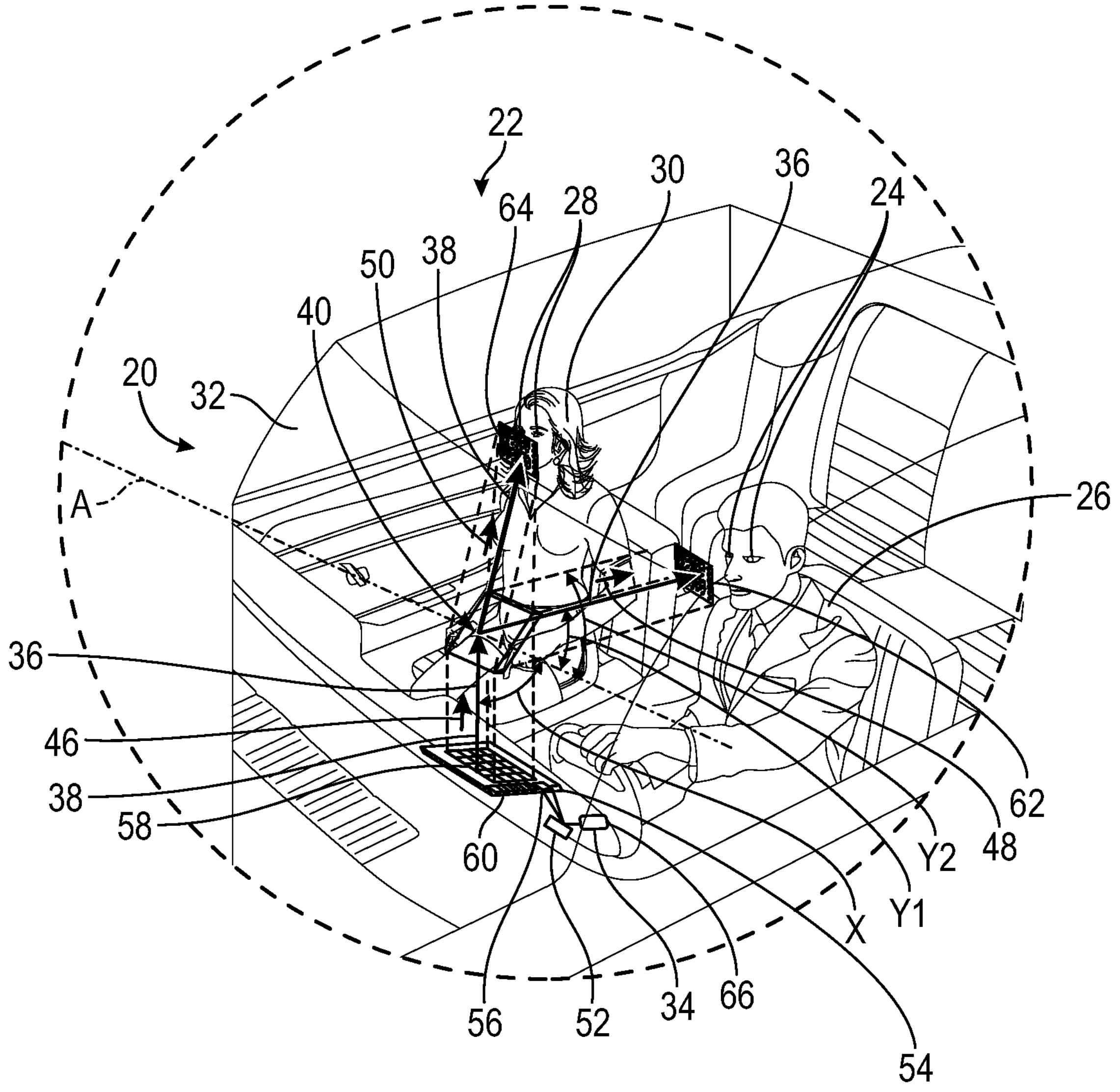
FIG. 1 is a perspective view of one example of a vehicle comprising a head-up display system including an illumination device emitting first and second display lights and a holographic panel diffracting the first display light toward eyes of a first occupant and the second display light toward eyes of a second occupant.

Referring to FIG. 1, a head-up display system is shown generally at 20. The head-up display system 20 is configured for use with a vehicle 22. The head-up display system 20 visually transmits information to eyes 24 of a first occupant 26 and eyes 28 of a second occupant 30. In one example, the first occupant 26 is positioned within the vehicle 22 to operate the vehicle 22 (i.e., the driver) and the second occupant 30 is positioned within the vehicle 22 as a passenger. More specifically, the first and second occupants 26, 30 may be seated within the vehicle 22, with the first occupant 26 seated in an operator seat positioned for operating the vehicle 22 and with the second occupant 30 seated in a passenger seat. In the example shown in FIG. 1, the operator seat and the passenger seat are positioned side-by-side such that both occupants 26, 30 are facing a front end of the vehicle 22. Furthermore, the operator seat and the passenger seat are aligned laterally across the vehicle 22. The head-up display system 20 further comprises a windshield 32. Both of first and second occupants 26, 30 are positioned to see through the windshield 32 and outside of the vehicle 22.

The head-up display system 20 is arranged to transmit information to both of the first and second occupants 26, 30 to operate the vehicle 22. As such, the first occupant 26 may utilize the information to directly operate the vehicle 22. The second occupant 30 may utilize the information to assist the first occupant 26 in operating the vehicle 22 (e.g., by providing verbal cues to the first occupant 26 and/or by providing supplementary direct operation of controls within reach of the second occupant 30). Said differently, the second occupant 30 may utilize the information to "co-pilot" the operation of the vehicle 22. The information presented to the occupants 26, 30 may pertain to the operation of the vehicle 22, such as the vehicle's velocity, direction of travel, engine revolutions per minute, fuel level, battery state of charge, navigational instructions, blind-spot indication, interior and exterior temperatures, weather indications, indication of obstacles, comfort controls, radio settings, just to name a few. However, the information may pertain to any suitable topic or subject that may be displayed to occupants 26, 30.

Figure 5:
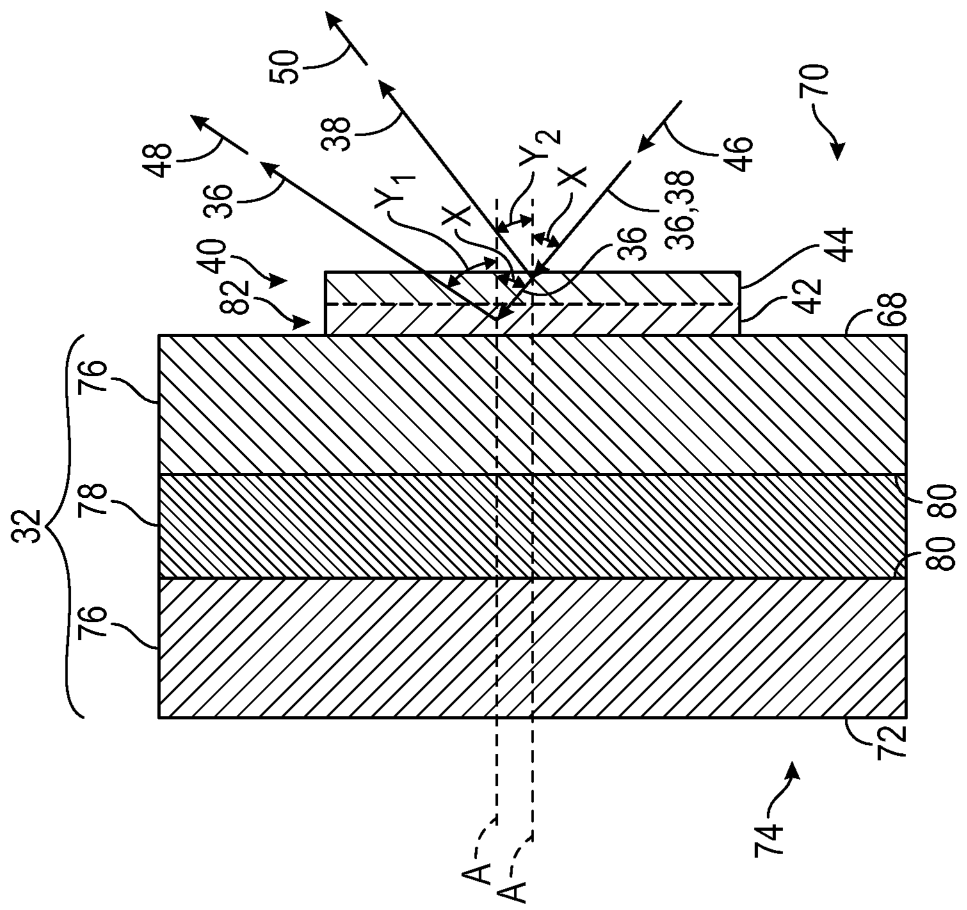
FIG. 5 is a cross-sectional view of one example of the head-up display system showing the holographic panel disposed along an inner surface of the windshield.

The head-up display system 20 comprises an illumination device 34 configured to emit a first display light 36 having a first polarization and a second display light 38 having a second polarization. The windshield 32 is spaced from the illumination device 34 and extends transverse to the first and second display lights 36, 38. The head-up display system 20 further comprises a holographic panel 40 coupled to and extending with the windshield 32 and comprising a first layer 42 and a second layer 44 (see FIGS. 5 and 6). The first and second display lights 36, 38 emit toward the holographic panel 40 in an entrance direction 46 at an entrance angle X relative to an axis A normal to the holographic panel 40. The first layer 42 is arranged to diffract the first display light 36 having the first polarization in a first exit direction 48 at a first exit angle Y1 relative to the axis A toward the eyes 24 of the first occupant 26. The second layer 44 is arranged to diffract the second display light 38 having the second polarization in a second exit direction 50 at a second exit angle Y2 relative to the axis A, and different than the first exit angle Y1, toward the eyes 28 of the second occupant 30.

More specifically, the first and second occupants 26, 30 are spaced from one another. Without the holographic panel 40, light emitted from the illumination device 34 reflects off the windshield 32 with an exit angle that is equal to the entry angle. The illumination device 34 may be positioned to transmit light toward the windshield 32 at an entrance angle that will diffract at an exit angle toward one of the first and second occupants 26, 30. However, because the first and second occupants 26, 30 are spaced from one another, the light will transmit to the eyes 24, 28 of the one of the occupant and not toward the eyes 24, 28 of the other occupant. The first and second layers 42, 44 of the holographic panel 40 are configured to diffract the first and second display lights 36, 38 in the different first and second exit angles Y1, Y2, which allows the information within the first and second display lights 36, 38 to reach both of the occupants 26, 30, rather than one. Moreover, the first and second exit angles Y1, Y2 may be different than the entrance angle X. As such, the first and second layers 42, 44 may alter the first and second display lights 36, 38 such that the first and second exit angles Y1, Y2 are not dictated by the normal axis A and the corresponding first and second entry angles Y1, Y2.

In the example shown in FIG. 1, the windshield 32 is positioned above the illumination device 34. As such, the first and second display lights 36, 38 transmit upwardly in the entrance direction 46 toward the windshield 32. The positioning of the windshield 32 transverse to the first and second display lights 36, 38, in conjunction with the holographic panel 40, facilitates diffraction of first and second display lights 36, 38 toward the eyes 24, 28 of the first and second occupants 26, 30.

In another aspect, the head-up display system 20 further comprises at least one spatial light modulator 52 proximate the illumination device 34 and arranged to receive the first and second display lights 36, 38 emitted from the illumination device 34, impose a holographic image on the first and second display lights 36, 38, and transmit the first and second display lights 36, 38 toward the holographic panel 40. The SLM 52 may modulate the intensity of the display lights. In another example, the SLM 52 modulates the phase of the display lights. In another example, the SLM 52 modulates both the intensity and the phase simultaneously.

In another aspect, the head-up display system 20 further comprises a pupil replicator 54 arranged to receive the first and second display lights 36, 38 emitted from the illumination device 34, replicate the first and second display lights 36, 38 into a plurality of first display light 36 and a plurality of second display light 38, transmit the plurality of first display light 36 parallel to one another toward the holographic panel 40, and transmit the plurality of second display light 38 parallel to one another toward the holographic panel 40. The pupil replicator 54 may define an input aperture 56 and an output aperture 58 and may comprise a waveguide 60 positioned between the input and output apertures 56, 58. The display light may enter the pupil replicator 54 from the SLM 52 through the input aperture 56 and totally internally reflect within the waveguide 60. As shown in FIG. 1, the output aperture 58 may occupy a surface area that is greater than a surface area of the input aperture 56. The first and second display lights 36, 38 totally internally reflects within the waveguide 60, with the reflection scattering the first and second display lights 36, 38 across the output aperture 58. The first and second display lights 36, 38 then exits the pupil replicator 54 as the plurality of first display light 36 and the plurality of second display light 38 across the surface area of the output aperture 58. As such, the pupil replicator 54 expands the area in which the first and second display lights 36, 38 from the illumination device 34 may be viewed. More specifically, the surface area of the output aperture 58 is sized and shaped to transmit the plurality of first display light 36 to an equivalently sized and shaped first eyebox 62 and the plurality of second display light 38 to an equivalently sized and shaped second eyebox 64. The first and second eyeboxes 62, 64 are the position of the plurality of first display light 36 and the plurality of second display light 38 within the vehicle 22 at which the respective eyes 24, 28 of the first and second occupants 26, 30 should be positioned. More specifically, the first and second eyeboxes 62, 64 provide the plurality of first display light 36 and the plurality of second display light 38, respectively, over a surface area that is equivalent to the output aperture 58 of the pupil replicator 54. The surface area allows for deviations in the positioning of the eyes 24, 28 of the occupants 26, 30 (such as variations in the size of different occupants 26, 30, variations in the positioning of the occupants 26, 30, and general movement of the occupants 26, 30, just to name a few) while maintaining the transmission of the first and second display lights 36, 38. The projection of the plurality of first display light 36 and the plurality of second display light 38 across the first and second eyeboxes 62, 64, respectively, ensures that the information within the first and second display lights 36, 38 is continuously transmitted to the first and second occupants 26, 30 (i.e., preventing the information from alternating between being visible and not visible due to variations in the positioning of the first and second occupants 26, 30).

In the example shown in FIG. 1, the illumination device 34 is further defined as a laser 66, with the first and second display lights 36, 38 emitted by the laser 66 each being coherent. However, the illumination device 34 may be any component suitable of emitting the first and second display lights 36, 38, such as a light emitting diode. In another example, the illumination device 34 is further defined as a picture generation unit. The picture generation unit emits the first and second display lights 36, 38 (with the information embedded therein) toward a mirror. The mirror reflects the first and second display lights 36, 38 toward the holographic panel 40. The first and second display lights 36, 38 transmit through the holographic panel 40. The first and second display lights 36, 38 may then diffract off of the windshield 32 and toward the eyes 24, 28 of the first and second occupants 26, 30. In one example, the picture generation unit is further defined as a liquid crystal display. In another example, the picture generation unit is further defined as a digital light processing projector.

Figure 8:
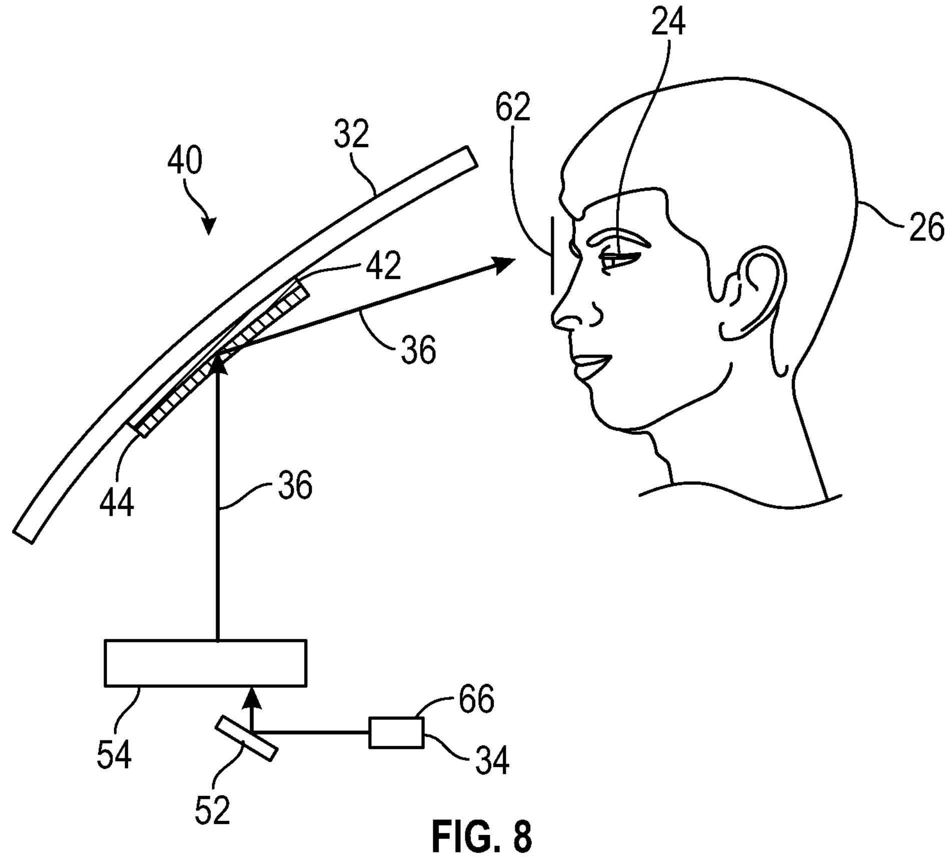
FIG. 8 is a side plan view of one example of the head-up display system showing the first display light diffracted toward the eyes of the first occupant.

In the example shown in FIGS. 1 and 8, the holographic panel 40 is positioned above the pupil replicator 54, with the plurality of first display light 36 and the plurality of second display light 38 transmitted from the pupil replicator 54 toward the holographic panel 40. In this example, the holographic panel 40 is sized relative to the entire output aperture 58 of the pupil replicator 54 such that all of the plurality of first display light 36 and the plurality of second display light 38 interact with the holographic panel 40.

The first polarization of the first display light 36 may be orthogonal to the second polarization of the second display light 38. The orthogonal orientation facilitates interaction between first display light 36 and the first layer 42 and interaction between the second display light 38 the second layer 44, with minimum interaction overlap. In one example, the orthogonal configuration between the first and second polarizations is further defined as horizontal and vertical linear polarization. In another example, the orthogonal configuration between the first and second polarizations is further defined as +45° and −45° linear polarization. In another example, the orthogonal configuration between the first and second polarizations is further defined as left and right circular polarization. However, the orthogonal configuration between the first and second polarizations may be any suitable orientation. Furthermore, the first polarization and the second polarization may be arranged in any suitable orientation.

The illumination device 34 may alternate emission of the first and second display lights 36, 38. The alternating emission of the first and second display lights 36, 38 reduces interference that may be present between the first and second polarizations if both of the first and second polarizations sent simultaneously within a single display light. The interference may result in image degradation to the occupants 26, 30. Alternating emission of the first and second display lights 36, 38 also increases intensity of the display lights to occupants 26, 30 as all light emitted at a given time is one of the display lights and one of the polarizations, rather than split into the first and second display lights 36, 38. Furthermore, alternating emission is used to emit the first and second display lights 36, 38 from a single illumination device 34. The first and second display lights 36, 38 may be emitted independently from two illumination devices 34 toward the holographic panel 40. The use of the single illumination device 34 to emit the first and second display lights 36, 38 reduces the cost and complexity of the head-up display system 20 and ensures consistent information is given to both occupants 26, 30.

The alternation may be performed at a frequency sufficient to prevent perceived flickering of the display lights to the occupants 26, 30. In one example, the frequency of the alternation in emission between the first and second display lights 36, 38 is greater than 50 Hz. In another example, the frequency of the alternation in emission between the first and second display lights 36, 38 is at least 60 Hz.

In one example, the first and second layers 42, 44 of the holographic panel 40 extend substantially parallel to one another and may both have a substantially planar configuration. More specifically, the first and second layers 42, 44 may stacked on one another. Accordingly, the holographic panel 40 may be substantially flat. In the example shown in the FIGS. 5 and 6, the second layer 44 is positioned in front of the first layer 42 such that the second layer 44 is closer to the illumination device 34. Because the layers 42, 44 are polarization dependent, the second layer 44 is not configured to interact with the first polarization of the first display light 36. When emitted, the first display light 36 transmits through the second layer 44 and into the first layer 42. The first layer 42 is arranged interact with the first display light 36 having the first polarization. The first layer 42 diffracts the first display light 36 toward the eyes 24 of the first occupant 26. The first display light 36 transmits back through the second layer 44, leaves the holographic panel 40, and continues toward the eyes 24 of the first occupant 26. When the second display light 38 is emitted, the second display light 38 enters the second layer 44 of the holographic panel 40. The second layer 44 is arranged interact with the second display light 38 having the second polarization. The second layer 44 diffracts the second display light 38 toward the eyes 28 of the second occupant 30. Minimal amounts (if any) of the second display light 38 passes through the second layer 44 and into the first layer 42. The second display light 38 leaves the holographic panel 40 and continues toward the eyes 28 of the second occupant 30. It is to be appreciated that first and second layers 42, 44 may be stacked such that the first layer 42 is closer to the illumination device 34. In such an example, the second display light 38 transmits through the first layer 42 and into the second layer 44 where the second display light 38 is diffracted. The first display light 36 is diffracted by the first layer 42 with minimal amounts (if any) of the second display light 38 passing through the first layer 42 and into the second layer 44.

In one example, the layers 42, 44 of the holographic panel 40 comprise a transparent polymer configured to transmit light therethrough. However, the holographic panel 40 may comprise glass or any other material suitable for transmitting light therethrough.

Figure 3:
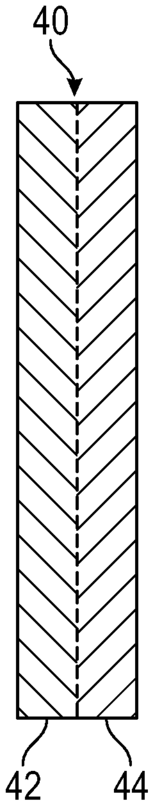
FIG. 3 is a cross-sectional view of one example of the holographic panel showing first and second layers integrally formed of a unitary material.
Figure 4:
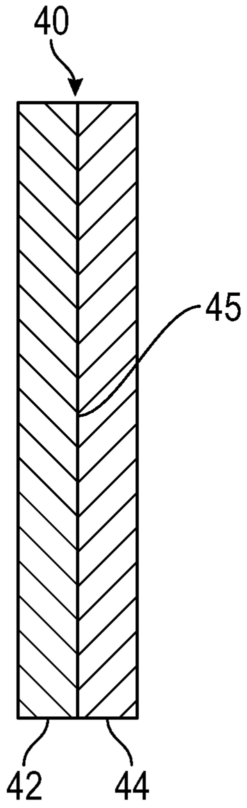
FIG. 4 is a cross-sectional view of one example of the holographic panel showing the first and second layers bonded with an adhesive.

In the example shown in FIG. 3, the layers 42, 44 of the holographic panel 40 are integrally formed of a unitary material, with the unitary material comprising a photopolymer. Each of the layers 42, 44 may be independently processed to form the holographic panel 40. More specifically, the photopolymer may be dispensed as a liquid equivalent to one layer and then cured to form the solidified layer. The next adjacent layer may be formed by dispensing the liquid photopolymer onto the solidified layer and then cured to a solid. Curing may be facilitated by exposing the liquid photopolymer to light. Moreover, variations in properties of the light may result in variations in optical properties of the layers 42, 44 (e.g., the polarization). Alternatively, the layers 42, 44 may be formed separately and assembled successively to form the holographic panel 40, as shown in FIG. 4. More specifically, the layers 42, 44 may be formed into solid components that are then stacked upon one another in a laminate configuration. Moreover, the adjacent layers 42, 44 may be bonded to one another with an optically clear adhesive 45 having a refractive index substantially equal to an average refractive index of the holographic panel 40. As such, the adhesive 45 is configured to bond the layers 42, 44 without significantly altering the optical properties of the layers 42, 44 and the holographic panel 40 as a whole.

Figure 6:
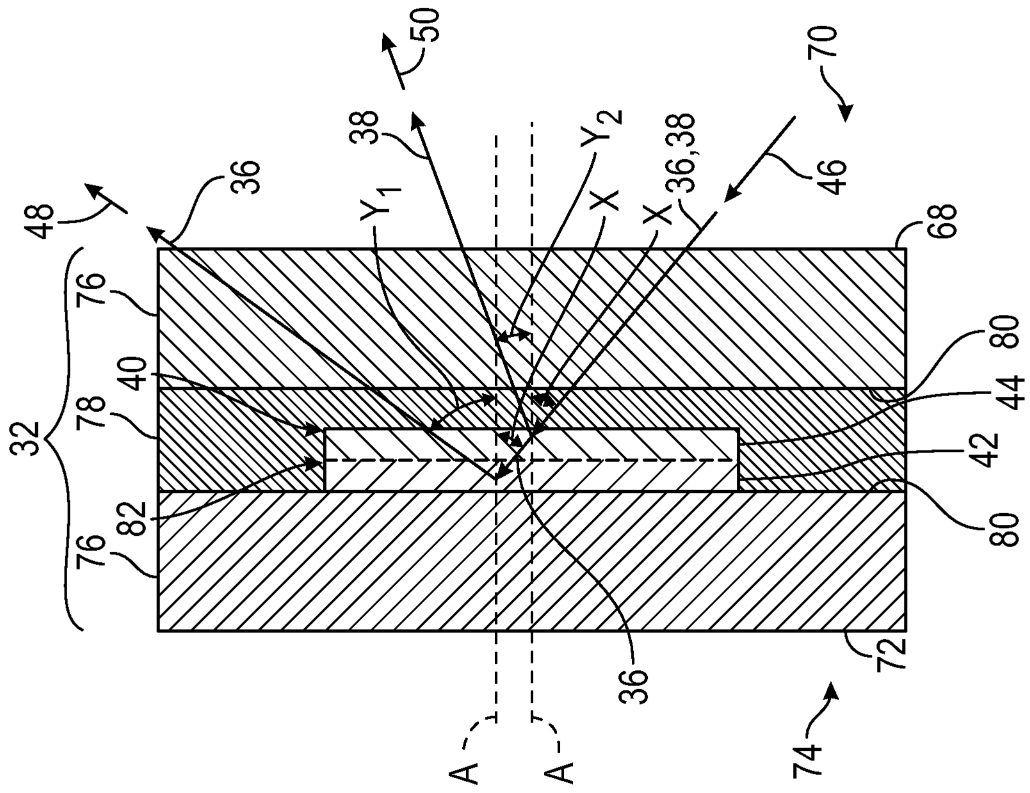
FIG. 6 is a cross-sectional view of one example of the head-up display system showing the holographic panel disposed along an internal surface of one sheet of the windshield.

The windshield 32 may comprise an inner surface 68 facing an interior 70 of the vehicle 22 and an external surface 72 facing an exterior 74 of the vehicle 22. In the example shown in FIG. 5, the holographic panel 40 is disposed along the inner surface 68 of the windshield 32. The windshield 32 may comprise at least two sheets 76 stacked between the inner and outer surfaces. The at least two sheets 76 may be comprised of glass with a polymer interlayer 78 disposed therebetween to bond the sheets 76 together and to hold the sheets 76 in place in the event of shattering. Each of the sheets 76 comprise at least one internal surface 80 facing the internal surface 80 of another adjacent glass sheet 76. The holographic panel 40 may be disposed along the internal surface 80 of one of the sheets 76. FIG. 6 shows one example of holographic panel 40 disposed on the internal surface 80 of the sheet 76 having the external surface 72. In one example, the holographic panel 40 is a film 82 adhered to the windshield 32. However, the holographic panel 40 may be applied to the windshield 32 as a coating.

Figure 2:
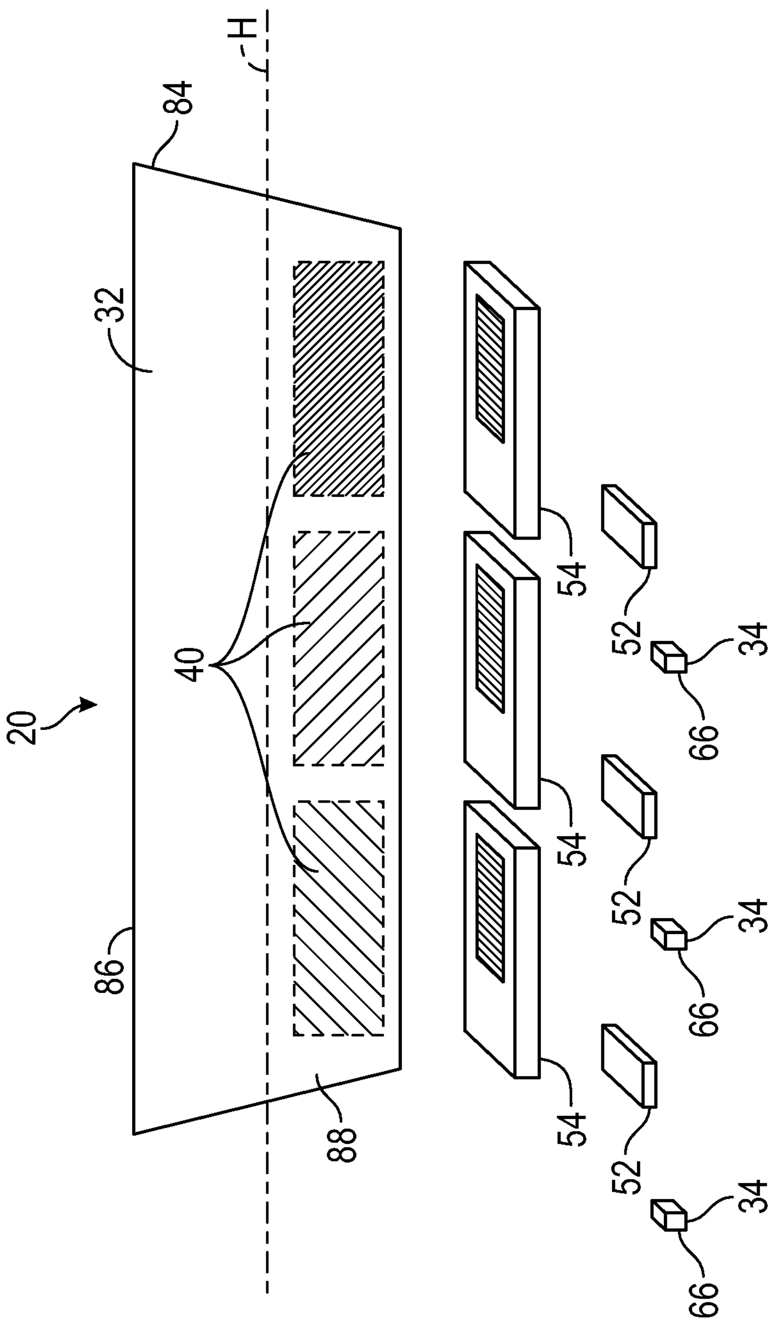
FIG. 2 is a perspective view of one example of the head-up display system showing three of the illumination device and three of the holographic panels, with the holographic panels disposed along a lower section of the windshield.

The windshield 32 defines a surface area 84. The holographic panel 40 may be disposed along a portion of the windshield 32 that is less than the surface area 84, as shown in FIG. 2. However, the holographic panel 40 may be disposed along the entire surface area 84 of the windshield 32. Furthermore, the windshield 32 defines a horizontal axis H bisecting the windshield 32 and defines an upper section 86 above the horizontal axis H and a lower section 88 below the horizontal axis H. The holographic panel 40 may be disposed within the lower section 88 of the windshield 32 as shown in FIG. 2. However, the holographic panel 40 may be disposed in the upper section 86 or in both of the upper and lower sections 86, 88.

Figure 7:
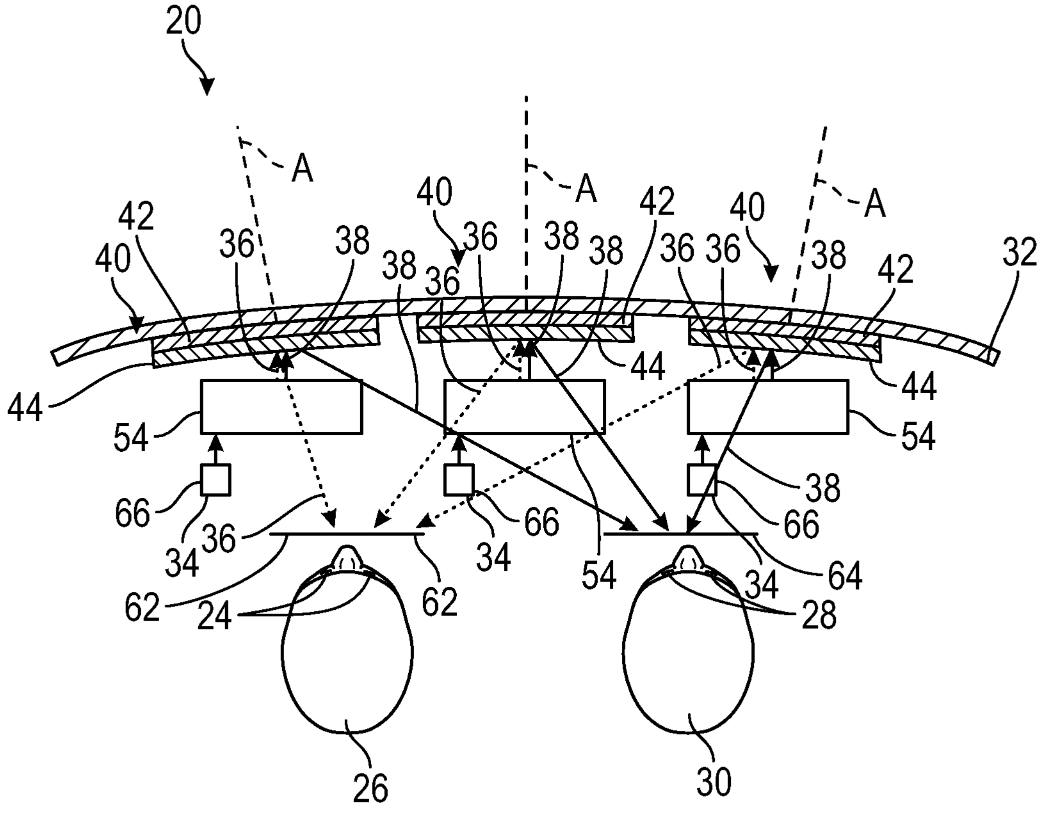
FIG. 7 is a top plan view of one example of the head-up display system showing the first and second display lights emitted by the three illumination devices and diffracted by the respective three holographic panels toward the eyes of the first and second occupants.

With reference to FIGS. 2 and 7, the illumination device 34 may be further defined as at least two illumination devices 34 and the holographic panel 40 may be further defined as at least two holographic panels 40, with each of the holographic panels 40 individually corresponding to the at least two illumination devices 34. Each of the at least two holographic panels 40 may be spaced from one another horizontally along the windshield 32. Each of the illumination devices 34 emit the respective first and second display lights 36, 38 toward the respective holographic panel 40 and each of holographic panels 40 diffract the respective first and second display lights 36, 38 toward the eyes 24, 28 of the first and second occupants 26, 30. In the example shown in FIGS. 2 and 7, the at least two illumination devices 34 is shown as three illumination devices 34 and the at least two holographic panels 40 is shown as three holographic panels 40. However, any number of illumination devices 34 and holographic panels 40 may be utilized. The at least two illumination devices 34 and the at least two holographic panels 40 provides multiple displays with multiple information to each of the occupants 26, 30. Accordingly, more information can be provided to the occupants 26, 30 without diverting the eyes 24, 28 of the occupants 26, 30 away from the road.

Accordingly, the head-up display system 20 offers several advantages. The holographic panel 40 diffracts the first and second display lights 36, 38 toward the eyes 24, 28 of the first and second occupants 26, 30, respectively, to provide information to both of the occupants 26, 30. In doing so, the second occupant 30 may provide assistance to the first occupant 26 improving the driving experience and improving safety.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A head-up display system of a vehicle for visually transmitting information to eyes of a first occupant and eyes of a second occupant, comprising:

an illumination device configured to emit a first display light having a first polarization and a second display light having a second polarization;

a windshield spaced from the illumination device and extending transverse to the first and second display lights; and a holographic panel coupled to and extending with the windshield and comprising a first layer and a second layer;

wherein the first and second display lights emit toward the holographic panel in an entrance direction at an entrance angle relative to an axis normal to the holographic panel;

wherein the first layer is arranged to diffract the first display light having the first polarization in a first exit direction at a first exit angle relative to the axis toward the eyes of the first occupant; and wherein the second layer is arranged to diffract the second display light having the second polarization in a second exit direction at a second exit angle relative to the axis, and different than the first exit angle, toward the eyes of the second occupant.

2. The head-up display system of claim 1, wherein the first and second exit angles are different than the entrance angle.

3. The head-up display system of claim 1, wherein the first polarization of the first display light is orthogonal to the second polarization of the second display light.

4. The head-up display system of claim 1, wherein the illumination device alternates emission of the first and second display lights.

5. The head-up display system of claim 1, wherein the layers of the holographic panel are integrally formed of a unitary material.

6. The head-up display system of claim 5, wherein the unitary material comprises a photopolymer, with each of the layers independently processed to form the holographic panel.

7. The head-up display system of claim 1, wherein the layers are formed separately and assembled successively to form the diffractive optical element.

8. The head-up display system of claim 1, wherein the windshield defines a surface area, with the holographic panel disposed along a portion of the windshield that is less than the surface area.

9. The head-up display system of claim 8, wherein the windshield defines a horizontal axis bisecting the windshield and defines an upper section above the horizontal axis and a lower section below the horizontal axis, with the holographic panel disposed within the lower section of the windshield.

10. The head-up display system of claim 1, wherein the windshield comprises an inner surface facing an interior of the vehicle and an external surface facing an exterior of the vehicle, with the holographic panel disposed along the inner surface of the windshield.

11. The head-up display system of claim 1, wherein the windshield comprises at least two sheets stacked between the inner and outer surfaces, with each of the sheets comprising at least one internal surface facing the internal surface of another adjacent glass sheet, and with the holographic panel disposed along the internal surface of one of the sheets.

12. The head-up display system of claim 11, wherein the at least two sheets are comprised of glass.

13. The head-up display system of claim 1, wherein the illumination device is further defined as at least two illumination devices and the holographic panel is further defined as at least two holographic panels, each individually corresponding to the at least two illumination devices, wherein each of the illumination devices emit the respective first and second display lights toward the respective holographic panel and each of holographic panels diffract the respective first and second display lights toward the eyes of the first and second occupants.

14. The head-up display system of claim 13, wherein the at least two holographic panels are spaced from one another horizontally along the windshield.

15. The head-up display system of claim 1, wherein the holographic panel is a film adhered to the windshield.

16. The head-up display system of claim 1, further comprising at least one spatial light modulator proximate the illumination device and arranged to receive the first and second display lights emitted from the illumination device, impose a holographic image on the first and second display lights, and transmit the first and second display lights toward the holographic panel.

17. The head-up display system of claim 1, further comprising a pupil replicator arranged to receive the first and second display lights emitted from the illumination device, replicate the first and second display lights into a plurality of first display light and a plurality of second display light, transmit the plurality of first display light parallel to one another toward the holographic panel, and transmit the plurality of second display light parallel to one another toward the holographic panel.

18. The head-up display system of claim 1, wherein the illumination device is further defined as a laser, with the first and second display lights emitted by the laser each being coherent.

19. A head-up display system of a vehicle for visually transmitting information to eyes of a first occupant and eyes of a second occupant, comprising:

an illumination device configured to emit a first display light having a first polarization and a second display light having a second polarization;

a windshield spaced from the illumination device and extending transverse to the first and second display lights; and a holographic panel coupled to and extending with the windshield and comprising a first layer and a second layer;

wherein the first and second display lights emit toward the holographic panel in an entrance direction at an entrance angle relative to an axis normal to the holographic panel;

wherein the first layer is arranged to diffract the first display light having the first polarization in a first exit direction at a first exit angle relative to the axis toward the eyes of the first occupant;

wherein the second layer is arranged to diffract the second display light having the second polarization in a second exit direction at a second exit angle relative to the axis, and different than the first exit angle, toward the eyes of the second occupant;

wherein the first and second exit angles are different than the entrance angle;

wherein the first polarization of the first display light is orthogonal to the second polarization of the second display light; and wherein the illumination device alternates emission of the first and second display lights.

20. A head-up display system of a vehicle for visually transmitting information to eyes of a first occupant and eyes of a second occupant, comprising:

at least two illumination devices each configured to emit a first display light having a first polarization and a second display light having a second polarization;

a windshield spaced from the illumination device and extending transverse to the first and second display lights; and at least two holographic panels coupled to and extending with the windshield, with each comprising a first layer and a second layer, and with each of the holographic panels individually corresponding to the at least two illumination devices;

wherein each of the at least two illumination devices emit the respective first and second display lights emit toward the respective holographic panel in an entrance direction at an entrance angle relative to an axis normal to the holographic panel;

wherein the first layer of each of the holographic panels is arranged to diffract the respective first display light having the first polarization in a first exit direction at a first exit angle relative to the axis toward the eyes of the first occupant; and wherein the second layer of each of the holographic panels is arranged to diffract the respective second display light having the second polarization in a second exit direction at a second exit angle relative to the axis, and different than the first exit angle, toward the eyes of the second occupant; and wherein each of the illumination devices alternates emission of the first and second display lights.

* * * * *